(12) United States Patent
Heiland

(10) Patent No.: US 6,816,800 B2
(45) Date of Patent: Nov. 9, 2004

(54) METHOD OF RECORDING A VIBRATION ISOLATION SYSTEM

(76) Inventor: Peter Heiland, Karl-Liebknecht-Strasse 30, Raunheim D-65479 (DE)

( * ) Notice: Subject to any disclaimer, the term of this patent is extended or adjusted under 35 U.S.C. 154(b) by 5 days.

(21) Appl. No.: 10/211,752

(22) Filed: Aug. 2, 2002

(65) Prior Publication Data

US 2003/0050716 A1 Mar. 13, 2003

(30) Foreign Application Priority Data

Aug. 3, 2001 (EP) .............................................. 01118656

(51) Int. Cl.[7] .......................... G06F 19/00; G05B 13/04; B64C 27/00; G01B 11/14
(52) U.S. Cl. ....................... 702/109; 160/310; 188/378; 219/121.69; 244/17.27; 244/54; 318/649; 702/109
(58) Field of Search ............................ 702/33, 54, 109; 160/310; 181/120; 188/378; 244/17, 27, 54; 219/121.69; 318/649; 331/17; 356/614; 360/265.7; 600/459

(56) References Cited

U.S. PATENT DOCUMENTS

| | | | | |
|---|---|---|---|---|
| 3,701,499 A | * | 10/1972 | Schubert et al. ......... 244/17.27 |
| 4,096,445 A | * | 6/1978 | Hopwood et al. ............ 331/17 |
| 5,517,426 A | * | 5/1996 | Underwood ................. 702/109 |
| 5,666,202 A | * | 9/1997 | Kyrazis ....................... 356/614 |
| 5,734,246 A | * | 3/1998 | Falangas ..................... 318/649 |
| 5,823,307 A | * | 10/1998 | Schubert et al. ............ 188/378 |
| 5,853,005 A | * | 12/1998 | Scanlon ....................... 600/459 |
| 6,408,978 B1 | * | 6/2002 | Premus ........................ 181/120 |
| 6,460,803 B1 | * | 10/2002 | Kiss et al. ..................... 244/54 |
| 6,476,351 B1 | * | 11/2002 | Kaplan et al. ......... 219/121.69 |
| 6,480,363 B1 | * | 11/2002 | Prater ....................... 360/265.7 |
| 6,497,267 B1 | * | 12/2002 | Azar et al. ................... 160/310 |

* cited by examiner

Primary Examiner—John Barlow
Assistant Examiner—John Le

(57) ABSTRACT

In relation to a vibration isolation system, which comprises at least one vibration isolation device that can be assigned to an isolation element, the fact that a method of recording the system with the aid of a closed-loop and/or open-loop control device is provided, in which a closed-loop and/or open-loop control structure can be predefined and in which signals and/or variables related to the isolation system are picked up, processed and/or provided, and in which, on the basis of the definable structures and variables, at least one isolation system characteristic data set for assessing the vibration isolation system is formed, means that for the first time the indicative fundamentals for an open system for evaluation, closed-loop and open-loop control are provided.

45 Claims, 5 Drawing Sheets

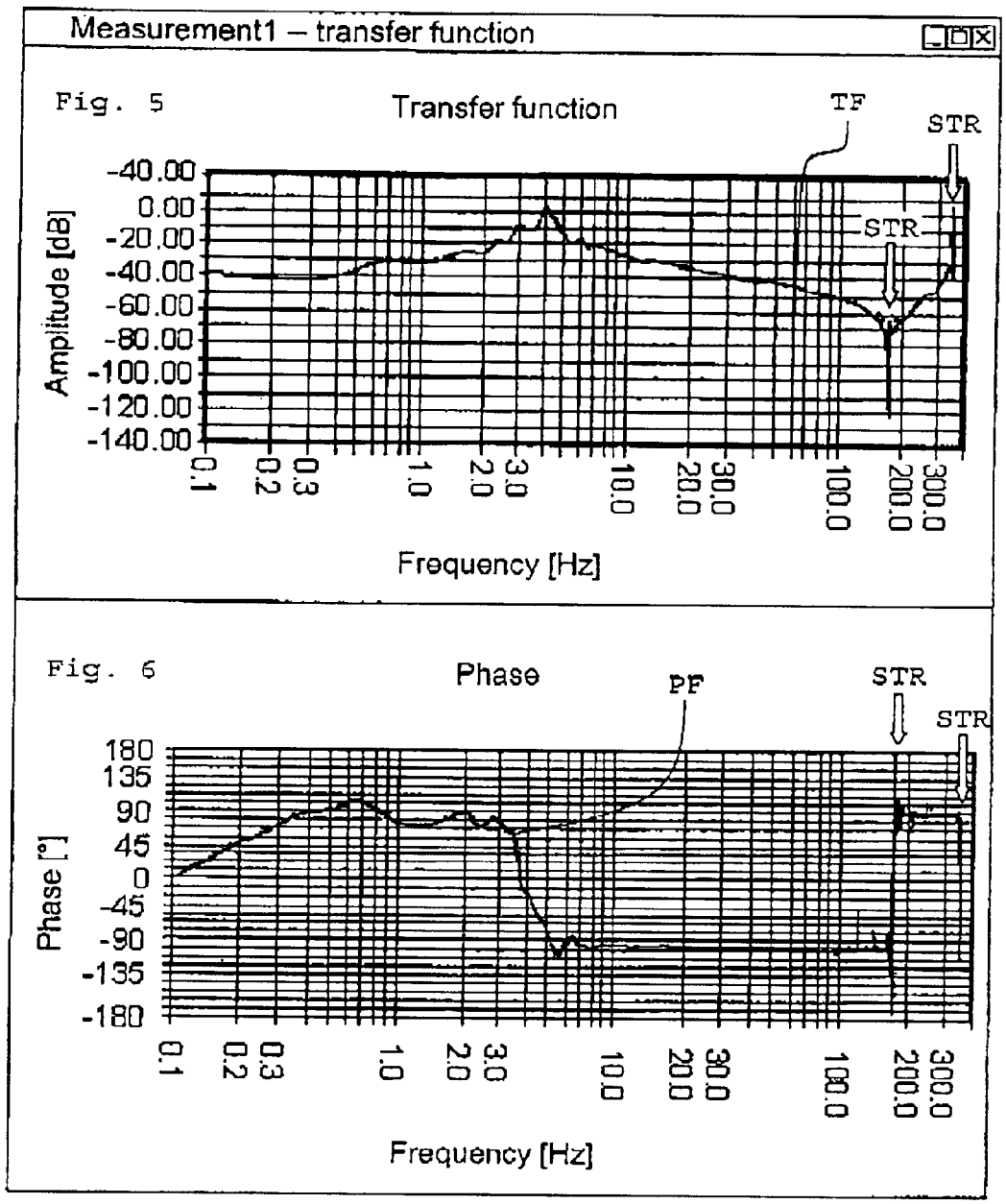

METHOD OF RECORDING A VIBRATION ISOLATION SYSTEM

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates to a method of recording a vibration isolation system having at least one vibration isolation device that can be assigned to an isolation element th vibration isolation system being assigned as at least one of a closed-loop or open-loop control device; a computer program for carrying out the method on a computer wherein the computer program comprises a plurality of program modules; an apparatus for carrying out the method and for executing the computer program wherein the at least one of the closed-loop or open-loop control devices comprises at least one of a controller unit or user-oriented function units; and a system for recording a vibration isolation system that comprises an apparatus for carrying out a computer program.

TECHNICAL FIELD

Methods for vibration isolation are known in which the control of a vibration isolation system is carried out on the basis of a substantially fixedly predefined parameter set. In particular, the missing or inadequate possibilities of monitoring or diagnosis, that is to say the absence of fault detection and elimination on the vibration isolation system, have been shown to be a problem in the vibration isolation of existing systems.

Known methods, computer programs and apparatuses for vibration isolation also have the disadvantage that they provide barely any interfaces via which, for example, diagnostic data are or can be picked off in a simple way, processed and made available to the user.

However, the difficulty of gaining access to data hampers not only the monitoring of the vibration isolation system but also flexible adaptation of the same to new or unforeseeable states or situations.

SUMMARY OF THE INVENTION

It is therefore an object of the invention to provide an open system for recording and/or assessing a vibration isolation system.

According to the invention, this object is achieved, inter alia, by a method of recording a vibration isolation system having at least one vibration isolation device that can be assigned to an isolation element, the vibration isolation system being assigned at least one of a closed-loop or open-loop control device, including the following steps:

providing at least one of a closed-loop or open-loop control structure;

picking up and processing signals and/or variables related to the isolation system by exciting the vibration isolation system into vibration, forming at least one isolation system characteristic reference fingerprint data set on the basis of the control structure and the recorded variables for assessing the vibration isolation system, recording and forming an actual fingerprint data set, comparing at least part of the reference fingerprint with at least part of the actual fingerprint, and assessing the state of the vibration isolation system on the basis of specific deviations between the reference and the actual fingerpint.

Furthermore, for the purpose of achieving the object, a system as claimed is specified, which comprises the method, the computer program having the features as claimed and the apparatus having the features as claimed.

In relation to a vibration isolation system, which comprises at least one vibration isolation device that can be assigned to an isolation element, the fact that a method of recording the system with the aid of a closed-loop and/or open-loop control device is provided, in which a closed-loop and/or open-loop control structure can be predefined and in which signals and/or variables related to the isolation system are picked up, processed and/or provided, and in which, on the basis of the definable structures and variables, at least one isolation system characteristic data set for assessing the vibration isolation system is formed, means that for the first time the indicative fundamentals for an open system for evaluation, closed-loop and open-loop control are provided.

In this sense, the method as claimed by the invention offers the possibility of adapting the closed-loop and open-loop control structure provided in a differentiated manner to individual requirements. In this case, provision is advantageously made, in particular within the context of the provision of the closed-loop and/or open-loop control structure in flexible form, for the provision of an extremely wide range of control loops to be made. In this way, the method permits the definition of diverse types of control, such as feedback and/or feed-forward control. In order, moreover, also still to be able to compensate for time fluctuations in the isolation system, the closed-loop and/or open-loop control structure according to the invention also offers the possibility of adaptive control, that is to say the ability of the method to adapt itself to aging processes or external influences, for example.

The variability of the method is also expressed in the fact that in the method, in particular acceleration-determined and/or speed-determined and/or position-determined control loops in the closed-loop and/or open-loop control structure can be selected and defined, in particular independently of one another. Appropriate actuators and control variables or sensors tuned to the isolation system are likewise specified in the method of the invention. For this purpose, the controlled variables in the closed-loop and open-loop control structure can be specified individually, in particular in relation to the actuators and sensors. Examples which may be mentioned here are variables such as in particular limiting values for overload currents with regard to motors belonging to actuators or else controlled variables relating to a pneumatic vibration isolation system.

Also connected with this is the fact that, according to the invention, the possibility is advantageously open of tuning the control loops per se and amongst one another in an extremely differentiated manner. Stabilization or self-stabilization of the vibration isolation system is therefore achieved, with very positive effects. In this case, for example, changeover criteria between the control loops can be defined or individual filters and/or amplifiers can be adjusted, for example with reference to controller gain factors. In addition, mention should be made in particular of the possibility that, with regard to each axis to be isolated, the scope of the influence which the respective signals picked up or sensor signals have or are to have on the axis to be isolated can be determined or predefined. The same is also true of the output signals for the control of the actuating variables.

In addition to the parts of the method already specified above, the method of course also includes the closed-loop and/or open-loop control of the vibration isolation system, in particular on the basis of the control structure provided and/or with the aid of the variables and/or signals and/or of the isolation system characteristic data set. The closed-loop control and/or open-loop control and the control structure provided in this case relate in particular and primarily to all the inventive aspects known and still to be explained relating to vibration isolation and preferably to all the degrees of freedom which are available or are to be isolated.

Consequently, a significant aspect of the invention also consists in particular in providing interfaces of an extremely wide range of types, in order to permit substantially optimal data processing. What are preferably concerned here are interfaces to the hardware and those to the software on the basis of program code means and/or the adaptation of software to existing hardware interfaces, and user interfaces. In this case, the interfaces are used firstly for the acquisition and for the interchange of signals and data between the vibration isolation system and the closed-loop and/or open-loop control device or else, in addition, for the internal forwarding or further processing in the closed-loop and/or open-loop control device and for man-machine data interchange. Furthermore, however, according to the invention provision is also made to provide interfaces which permit the feeding of external signals, for example excitation signals for the vibration isolation system, and those which permit signals to be picked off in a specific way. In the case of the latter, they may be, for example, actuating variables/ actuating signals or control deviations in a control loop. Use is preferably made of serial interfaces, for example interfaces which are based on the RS232 standard, as internal interfaces in the closed-loop and/or open-loop control device.

However, the method according to the invention includes not only the provision of interfaces but also their monitoring and/or control and/or configuration with regard to data interchange. In this case, for example, it is also ensured that a parallel interface can be used not only by an application in the closed-loop and/or open-loop control unit, but that the interface can be used by a plurality of applications at the same time. Furthermore, parallel operation with a plurality of interfaces is also ensured. In addition, interfaces can also be coordinated in such a way that remote control of the vibration isolation system is possible. According to the invention, the latter can be made possible, for example, by providing DCOM functionality (Distributed Component Object Model functionality).

In order to secure the configuration data provided for the closed-loop and/or open-loop control structure, the data or signals picked up and the data sets formed, their recording or storage or saving is advantageously provided within the context of the method. In this way, the information is also retained for subsequent applications, for example for comparison and/or for export.

In a further advantageous development of the method according to the invention, the latter likewise also includes the testing of the closed-loop and/or open-loop control structure. In this case, in the method, for example, external excitation signals are provided or fed in via the interfaces provided and/or processing steps for the test excitation of the vibration isolation system or, for the same purpose, internal excitation signals are generated. The result of the test excitation is recorded in the closed-loop and/or open-loop control device, is further processed and recorded. In accordance with the invention, the test excitations can advantageously be configured in detail and stored. To this end, examples which may be mentioned are the specification of the excitation on specific degrees of freedom or on specific control loops.

A further substantial and advantageous aspect of the invention also consists in the fact that flexible monitoring functions are provided which, for example in the context of defining or configuring monitoring or tolerance criteria, can be used for general or permanent testing of method steps and/or parameters or variables, for example in the form of background monitoring. To this extent, provision is made within the context of the invention, for example, to monitor the functioning of actuators. In specific terms, for example temperatures and states of actuating motors and the control of a pneumatic vibration isolation device and the actuating offset of the valves used there can be monitored. Furthermore, the monitoring function of the invention is advantageously designed in such a way that in principle all closed-loop and open-loop control variables, for example control loop tuning variables, are accessible for background monitoring. However, the invention is not restricted to the higher-order general or permanent testing of all the relevant vibration isolation variables; instead monitoring areas can be selected in a differentiated manner, so that for example the monitoring possibilities can also be referred to selectable control loops and, in the latter, for example, to individual degrees of freedom to be monitored and, in this case, in turn to associated actuating variables. Within the context of the invention, nothing stands in the way of further differentiation of the monitoring. Here, it should also be pointed out that the selection of the monitoring data exists not only in relation to the quasi-vertical direction—on this point, see the preceding explanations—but also in the horizontal direction, that is to say it is also possible for monitoring data from an extremely wide range of regions to be associated with one another.

In a particularly advantageous development of the method according to the invention, provision is made therein to form a specific fingerprint for the vibration isolation system, by using which, for example, comprehensive characterization and/or assessment of the isolation system can be performed. The terminology of the fingerprint to this extent designates in particular an identification pattern for a vibration isolation system based on a predefined closed-loop and/or open-loop control structure. In addition to characteristic data sets, the fingerprint also contains information about functional relationships which are specific to vibration isolation and using which an isolation system can be described.

In this case, for example, power spectra of vibrations are picked up and/or determined. What are concerned here are, firstly, in particular vibrations that excite the vibration isolation system and, secondly, in particular vibrations which originate from the isolation element and which represent the reaction of the isolation element to the excitation. In addition, the fingerprint advantageously contains in particular information relating to transfer functions, from which in particular the resonant behavior of the isolation element may be read off with reference to the exciting vibration. Corresponding pointers can be determined, for example, from the vibration phase function, that is to say the phase profile with regard to exciting and resulting vibration. Therefore, appropriate data can be and is likewise assigned to the fingerprint. Important conclusions relating to the vibration behavior and/or the change behavior of the vibration isolation system or the vibration isolation device or the isolation element, in addition to the functional relationships already mentioned, can in particular also be obtained from the coherence of the vibrations, so that, according to the inventions, the characteristic fingerprint also comprises such information or data sets.

It should be pointed out that the abovementioned variables, which are picked up and/or determined in accordance with the invention, within the context of the invention are of course not just essential data for the fingerprint to be formed, but to this extent also concern important data in that on their basis, in the method according to the invention, inter alia control deviations can be determined with the aid of which actuating signals or actuating variables can be calculated, which can be fed back to the actuators. A fingerprint in the sense of the invention therefore in particular also constitutes a substantial part of the control structure since, as outlined above, in particular the time behavior of the vibration isolation system and therefore also changes under defined conditions can be read off and/or defined from it.

A further most advantageous development of the method consists in the possibility of determining the fingerprint according to the invention on the basis of simulation as well. This may be a pure simulation, within the context of which the vibration isolation system is simulated completely with the aid of a computer. However, the simulation can also consist in the vibration isolation system being simulated as a model on a laboratory scale, in order in this way to obtain a fingerprint in advance. Mixed forms of the simulation are of course also conceivable and provided.

Of course, the method advantageously also includes the recording or storage and the possibility of the import and export of correspondingly previously held or recorded fingerprints or at least part thereof. According to the invention, not only is pure static recording provided but, at the same time, dynamic recording is possible. In the sense of the invention, to this extent dynamic is to be understood in particular to mean continuous or multiple recording of fingerprints within specific time limits and intervals.

Within the context of the invention, for example vibration tolerance bands can be defined in an extremely advantageous manner via a comparison of at least two fingerprints or at least parts of the same. Furthermore, a fault register or a fault database can be built up in this way for the vibration isolation system, an assignment of faults in the vibration isolation system, which are expressed by a one or more specific deviations in the fingerprint as compared with a reference fingerprint, being carried out in the fore-ground by means of a comparison of fingerprints. Diagnostic capabilities are therefore most advantageously also associated with the method according to the invention. This means that, with the fingerprint according to the invention, faults or deficiencies can not only be determined and checked but also classified, in order in this way to be able to classify states of the vibration isolation system. A distinction is drawn to this extent, for example, between faulty states or deviations from the original state of the vibration isolation system which are caused by the vibration isolation device, and those which originate from the isolation element. Furthermore, however, it is also possible in detail for changes on the isolation element or in the vibration isolation device which have an effect on the vibration system to be self-triggered and detected. For example, in this connection mention should be made of the loosening of a hose or that of a screw on the isolation element. In this case, for example the fingerprint diagnosis can notify the user which hose has been loosened and at which point the hose is located, for example in relation to the isolation device. Such information is very useful to the user, since in this way repair times and therefore also production idle times can be reduced considerably.

It is not only the diagnostic capability of the method but also a method or system that is capable of learning which is founded in connection with the specification according to the invention of state fingerprints. The ability of the system to learn relates in particular to the continuous expandability of the fault database according to the invention, it being possible for the expansion according to the invention to be carried out, for example, via import interfaces or user interfaces. Furthermore, however, self-teaching is also provided in accordance with the method of the invention. For this purpose, for example, the diagnostic function and/or the control loops of the invention are preferably further supplemented by fuzzy logic or by fuzzy controllers, on the basis of which even only an inaccurately known relationship between disturbance and controlled variables and/or even the inaccurate relationship between two fingerprints can be quantified and determined.

A further advantageous development of the subject of the invention is also to be seen in the fact that the method in principle includes visualization of all the variables and/or data and/or relationships. This means, inter alia, that the behavior of the vibration isolation system or of the isolation element according to the invention can be displayed, in particular in three-dimensional form, within the context of all the tests, simulations and during active operation, on the basis of a user-oriented interface.

In addition to the method according to the invention, presented above, the invention also relates to a computer program for carrying out the method of the invention when the program is executed on a computer. In this case, the computer program according to the invention is distinguished by individual program modules which comprise object-specific, function-specific and user-specific computer program parts as a unit. Here, overlaps, for example in relation to diagnostic and test-specific program parts, are possible and provided. In a first specification, substantially two program parts can be distinguished according to the invention. These are, firstly, the controller-related software and the PC or host-system related software.

The core for vibration isolation is in this case the controller software, which is substantially responsible for the vibration isolation of the vibration isolation system. It also activates the appropriate interfaces to the vibration isolation device, that is to say to the device which in particular can comprise the isolation table, the sensors and actuators and possible further actuators, in particular also a pneumatic vibration system, and to the host system.

Furthermore, however, the controller module also has diagnostic capabilities relating to the vibration isolation system, in that for example overload currents of actuating motors are monitored independently and system instabilities can be controlled out automatically. In addition, the controller software possesses, inter alia, the capability of carrying out diagnostic tests of the vibration isolation system, suitable interfaces being provided for this purpose which, for example, also permit test excitation of the isolation system from outside.

For the communication with the host system, the controller module provides, for example, a command-driven RCI (Remote Command Interface) via which, inter alia, all the parameters of variables registered by the controller can be transmitted in digitized form to the PC/host system.

PC-based or host-system-based program parts of the computer program according to the invention substantially comprise user-related function modules, in particular for communication with and/or control of the controller module and/or of the controller. In their function as, in particular, user interfaces to the vibration isolation system, they expand in particular the diagnostic capabilities of the overall system comprising vibration isolation system and/or closed-loop and/or open-loop control device. In this case, function modules or program tools for installation and/or visualization and/or diagnosis and/or control loop tuning and/or controller function monitoring can be distinguished, overlaps in the function also being provided here and, if expedient, also being implemented.

Furthermore, in order to carry out the method according to the invention and to execute the computer program according to the invention, the invention also specifies an apparatus which comprises one or more components arranged for vibration-isolating operation, in particular sensors and/or actuators, which cooperate with a closed-loop and/or open-loop control device in such a way that at least one data set that is characteristic of the vibration isolating system can be provided. The closed-loop and/or open-loop control device is preferably likewise of modular design, corresponding to the computer program modules.

The same also applies to the system claimed by the invention for recording a vibration isolation system.

BRIEF DESCRIPTION OF THE DRAWINGS

The invention will be described in detail below by using a number of figures, in which:

FIG. 5 shows a window in the user interface SiDiMaT, in which a transfer function (force against speed) is displayed, FIG. 6 shows a window in the user interface SiDiMaT, in which a phase function is displayed.

DETAILED DESCRIPTION OF THE INVENTION

Figure 1:
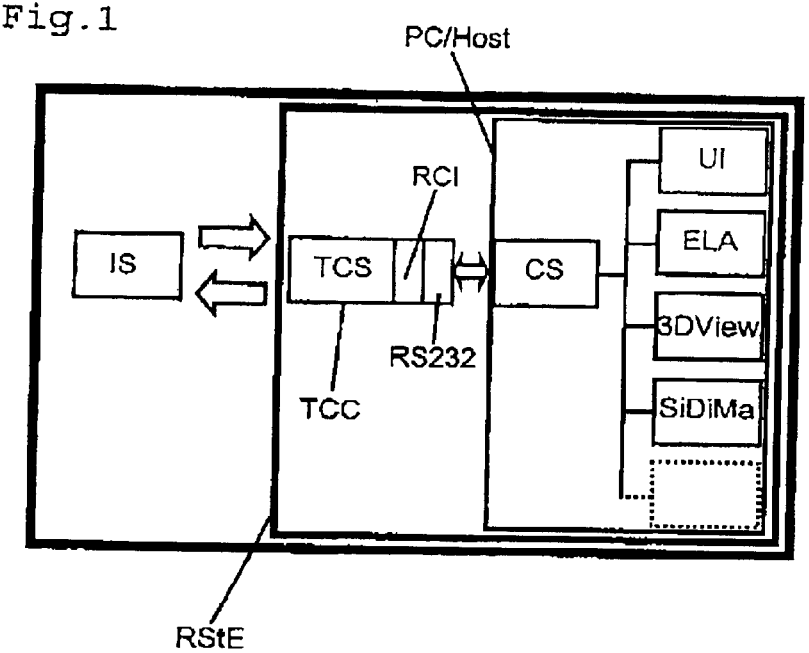
FIG. 1 shows a schematic overview of the system according to the invention for recording a vibration isolation system.

FIG. 1 reveals a diagram which illustrates in conjunction the individual components of the trans-mission, open-loop and/or closed-loop control system according to the invention. According to the present exemplary embodiment, the open-loop and/or closed-loop control system comprises both hardware and software components. The software or software modules (TCS, CS, UI, UI, ELA, 3DView, SiDiMaT etc.) which, inter alia, are used in this case and which are part of the closed-loop and open-loop control device RStE, are used substantially for the vibration isolation of vibration isolation systems having active components, such as valves and motors of actuators, which in turn are fed by open-loop and/or controlled-loop control signals from a TC controller (TCC), as it is known. Here, the software according to the invention provides all the functions which are needed for the active vibration isolation and, furthermore, user-definable diagnostic capabilities, which can be predefined via user interfaces based on MS Windows.

The software or program parts can be classified into three groups. These are, firstly, the controller-specific software (TCS) and, secondly, the PC/host applications, and also suitable "interface libraries" which, inter alia, permit the parallel application of a plurality of programs, even other programs, at the Windows level (not shown in FIG. 1).

Within the controller (TCC), the controller software (TCS) runs on a DSP (Digital Signal Processor). With its aid, all the sensor signals from the vibration isolation system (IS) are recorded and, on this basis, suitable actuator forces for vibration isolation are calculated. For this purpose, within the context of an exemplary embodiment, preferably 16 input channels and 20 output channels are available in relation to the vibration isolation system.

Furthermore, it offers the possibility of controlling and/or regulating a pneumatic isolation device and grants access to all the available parameters or variables. In one possible embodiment, for example, the vibration isolation has available a speed-determined control loop subsystem for all six degrees of freedom (three translation and three rotation degrees of freedom), six isolation control loops for a pneumatic isolation subsystem and six mutually independent control loops for a position-related isolation subsystem.

Furthermore, the controller software TCS opens up self-diagnostic capabilities, it being possible for the latter for example to prevent an actuating motor overload or else instabilities in the isolation system. For the purpose of actuating motor monitoring, the controller software permits online monitoring of the motor signal feed and an automated shutdown function for the same. Self-stabilization is preferably achieved by means of an automatic changeover between different control subsystems, for example by the possibility of predefining threshold values, amongst other things. The diagnostic capabilities of the controller software TCS also extend to the possibility of being able to carry out tests for checking the vibration isolation system, however. For this purpose, the controller TCC, in combination with the controller software TCS, includes the capability of generating test excitation signals and/or the possibility of feeding in external excitation signals, specifically in such a way that the excitation point or points in the vibration isolation system can be chosen freely in the control loops.

With reference to monitoring of the vibration isolation system, the controller TCC/controller software TCS according to the invention also permits the signals which are desired for monitoring to be picked off freely in the control loops. However, not only can signals measured by the controller TCC be forwarded but also important variables relating to performance monitoring, such as the energy consumption of the isolation system, etc., can be determined and provided appropriately.

The signals, in particular the signals serving for diagnosis, can be picked off from the controller TCC either in analog or in digital form, according to the invention.

The digital forwarding of signals to the PC/host system is preferably carried out via a command-driven software interface RCI, the RCI interface (Remote Command Interface) as it is known, to which preferably at least one RS232 interface is connected, which represents the hardware interface to the PC/host system. Of course, the invention supports every type of interface, such as USB, parallel ports, Ethernet, CAN bus, etc.

In order to permit access to the controller TCC, which is connected to the PC/host system via the serial interface, from a large number of PC/host applications, the invention provides the communication server CS, as it is known. According to one possible embodiment, the communication server CS is capable of operating with 16 installed serial interfaces RS232. Furthermore, it also comprises diagnostic capabilities, in particular for monitoring the RS232 interfaces.

In addition to the diagnostic functions, the communication server CS according to the invention comprises a display relating to the connection status and configuration elements relating to the hardware setting, to which the communication server CS makes access.

In this case, the status display provides information about the type of connection, that is to say whether it is a local or an external connection to a host system, about the name of the client that is connected to the communication server CS and about the application, that is to say whether for example the user interface UI or for example display tool 3DView has picked up the connection with the controller TCC. Furthermore, the date and the time at which the connection was picked up and the RS232 interface used are displayed. With regard to connection diagnosis, for example, a distinction can be drawn between two modes, the direct mode and the terminal mode. In direct mode, the application programs can communicate with the controller via the RS232 interface. In terminal mode, for example, characters can be entered via a keyboard and sent to the controller TCC via the RS232 serial interface. In a corresponding way, characters can also be received via the RS232 interface.

Via a specific hardware configuration function, the interfaces to be used during communication with the communication server CS can be defined. In order to make connections to, in particular, external host systems, the communication server CS uses the DCOM (Distributed Component Object Model) functionality, as it is known.

Figure 2:
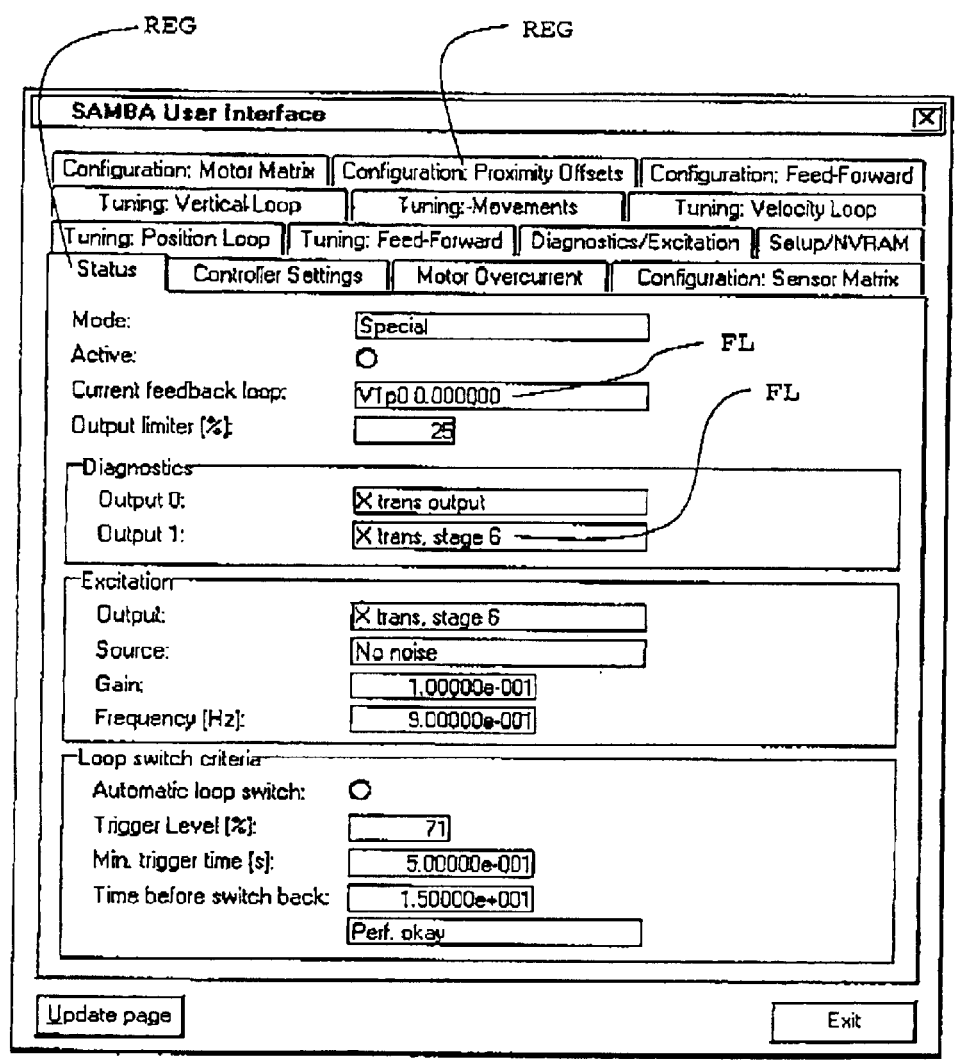
FIG. 2 shows the main access to the user interface (UI, User Interface)

In particular for the installation of the closed-loop and open-loop control device RStE, the same comprises a user interface UI (FIG. 2), as it is known. Using the user interface UI, it is possible to interrogate or to change substantially all the variables of the controller TCC. FIG. 2 reveals an overview of the content of the user interface UI. The register cards REG shown there comprise groups of controller data which are associated with various fields FL and which in each case contain the most up-to-date information.

The page shown in FIG. 2 is the status page, as it is known. This is used solely for information. This means that no data on this page can be changed. In the present case, it displays the set "special" test mode. The other information are also related to this. The field FL relating to the "current feedback loop" reveals the type of test control loop, namely "feedback". The fields FL relating to "diagnostics" reveal the degree of freedom to be diagnosed in the test control loop, here the translational degree of freedom in the x direction. The field FL "excitation" relates to the excitation signal, namely a signal with an amplitude of $1.0000*10^{-1}$ and a frequency of $9.0000*10^{-1}$ Hz and, on said field, where in the control loop and at which filter stage there the excitation is carried out, here in the direction of the translational degree of freedom in the x direction (xtrans, stage (filterstage) 6). From the field FL "loop switch criteria" according to FIG. 2, it can be gathered whether an automatic changeover between different control loops is provided for the stabilization of the vibration isolation system ("automatic loop switch" marked or not) and at which threshold values the changeover will be carried out "trigger level 71%", how long the minimum trigger time is, here $5.0000*10^{-1}$s, and how long it takes until a changeover to the translational x degree of freedom is carried out again, here $1.5000*10^{+1}$s. Furthermore, "Perf. okay" provides a reference to the fact that the performance, that is to say the function or performance of the system, is in order. By using the "update page" button, which is located on each of the register cards, it is possible to update the specified values continuously.

On the register card RL "controller settings", the "output limiter" can be adjusted. The "output limiter" represents a threshold which cannot be exceeded by the output signal. It therefore represents a safety function for connected actuators. Furthermore, the changeover criteria, that is to say for example threshold values, for the automatic control loop changeover can be changed there. In addition, the function monitoring settings can be changed there. Here, all the safety-relevant functions of the controller can be set. These are the parts of the controller which are tested in real time, also called the "built-in test". On the register card "motor overcurrent", threshold values for overcurrents with reference to the actuating motors can be entered. Furthermore, the motor power levels applied and the current state of the motors are displayed there. On the register cards "configuration: sensor matrix", it is possible to set how the input signals will influence each logic axis or each degree of freedom, separately in accordance with speed and position control loop. On the register card "configuration: motor matrix" it is possible to specify how the output signals each logic axis or each degree of freedom will be connected to one another, separated by speed and position control loop. The card "configuration: proximity offsets" permits the configuration of a vertical and/or horizontal distance offset, as used in the position control loop. Via the "configuration: feed-forward" card, it is possible to determine the manner in which each axis of the "feed-forward control loop" will be influenced by disturbances, such as the movement of the mounting table of the insulating element. Via the individual "tuning cards", the individual control loops can be tuned. In this case, in particular vertical tuning of the insulation element can be achieved by the "tuning: vertical loop card", tuning the pressure setpoints for isolation elements of different weights can be achieved via "tuning: movements", tuning of the speed-determined control loop can be achieved via the "tuning: velocity loop" card, tuning of the position control loop in conjunction with the tuning of the distance offset and the tuning of the feed-forward control loop can be achieved via the corresponding register card, the tuning of the feed-forward control loops including the predefinition of amplitudes. Furthermore, via the user interface, it is possible to define the point or the filter stage within the control loops at which, for example, a test excitation is to be carried out. For this purpose, use is made of the register card "diagnostic/excitation", on which the gain factors and the frequency of the excitation can also be configured. Via the register card "setup/NVRAM", in particular, the setting data of a controller are stored, loaded or deleted. Furthermore, via the "user interface" UI, the internal configuration of the digital-analog and of the analog-digital channel permutation tables can be defined.

Figure 3:
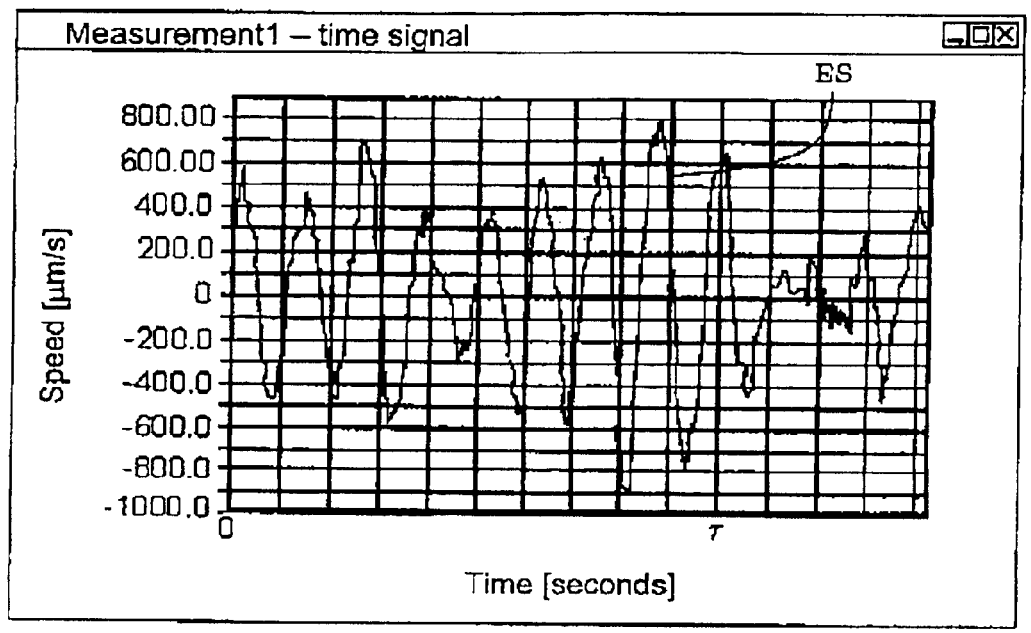
FIG. 3 shows a window in the user interface (SiDiMaT), in which the time profile of a transmission signal is displayed.
Figure 4:
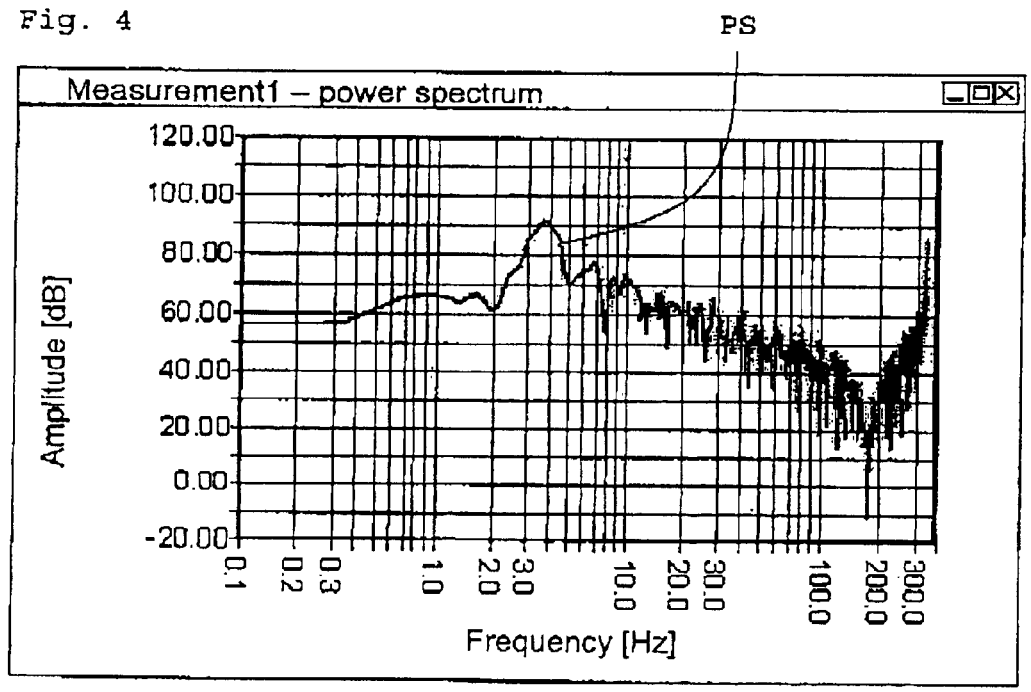
FIG. 4 shows a window in the user interface SiDiMaT, in which the power spectrum of a time signal is displayed as a function of frequency.
Figure 7:
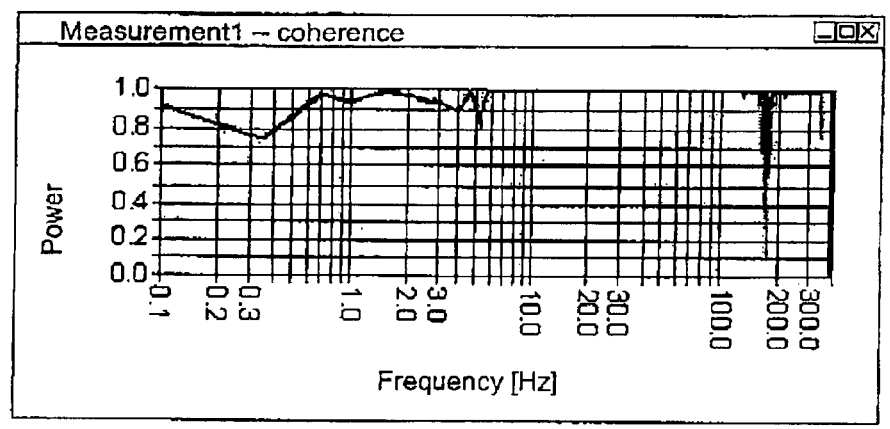
FIG. 7 shows a window in the user interface SiDiMaT, in which the coherence between exciting and transmitted signal is displayed as a function.

A further important host-side application consists in the signal display and manipulation tool SiDiMaT, which is also distinguished in particular by an "MDI" or "multiple document interface". This application is used as a highly developed tool for the automated classification of a vibration isolation system IS. For example, it is capable of determining automatically a transfer function TF (FIG. 5) for a vibration isolation system with reference to all six degrees of freedom, a transfer function TF being formed first with only passive damping of the isolation element and with the vibration isolation active in a second step. There is the possibility, for example, of forming the transfer function initially only for one degree of freedom, for example that of the x-translatory degree of freedom. FIG. 5 reveals such a transfer function as an example. In this case, this is a recording in the not actively damped state of the vibration isolation system IS. This can be seen in particular from the pronounced resonant peak RS at about 4.0 Hz. In order to calculate the transfer function TF, both the time profile of the exciting vibration ES (FIG. 3) and the vibration ES transmitted by the vibration system are recorded by the SiDiMaT. For the purpose of clarification, the graph of the time profile of the transmitted vibration is shown in FIG. 3 (speed in µm/s against time in seconds). Furthermore, in relation to both signals, the power spectrum PS (FIG. 4) is determined by Fourier transformation, from which the transfer function TF is formed in a suitable way. Furthermore, as standard the SiDiMaT also determines the phase relationship PF between exciting and transmitted vibration and, in order to monitor the measured results, forms the coherence function CF (FIG. 7) between the exciting and transmitted signal ES. In the present case, the coherence of the signal is in the range from 1 to 0.75 up to resonance.

On the basis of the functional relationships presented, far-reaching statements can be obtained, in particular about the necessary tuning of "feedback control loops" and also about changes of every type to the vibration isolation system IS. For example, by predefining specific tuning rules, manual or automatic tuning of the "feedback control loops" can be carried out by the SiDiMaT. Thus, according to the invention it is possible for the first time to perform specific stable configuration of the feedback merely on the basis of the conventional theory of configuration of feedback controllers, by using the phase and amplitude profiles.

Furthermore, by means of the abovementioned functional relationships, changes in the vibration isolation system IS can be determined. For example, on the transfer function curve TF, further resonances or resonance peaks, structure resonances STR, as they are known, can come to the surface, having their cause in constant disturbances to the vibration isolation system IS. In this case, there may be, for example, an object deliberately placed on the isolation element. In addition, it is also possible for coupling of the vibration axes to occur, for example, so that, instead of one resonance peak RS, a double or multiple resonance now occurs and becomes visible in the transfer function TF as a double peak.

All these changes in the transfer function TF can in general be allocated to specific changes in the vibration isolation system IS. In particular in order to make this finding useful, the SiDiMat offers the possibility of storing and/or exporting the information and data relating to the various functional relationships, in order in this way to make them accessible to further processing.

To this extent, the invention also includes the capability of recording the specific changes of functional relationships in the changing states of the vibration isolation system IS and assigning them to the corresponding states. This can be done either by means of manual input via suitable user interfaces or in automated form via fuzzy control loops. In this way, comparative data are made available, which permits simple fault or state detection. In a simplified embodiment, for example, a reference measurement can be defined in this way, possibly together with tolerance ranges for the vibration, which can serve as a reference measurement, it being possible for the current measurement to be placed over the reference measurement in the same graph, for example a further transfer function in FIG. 5. This permits a direct comparison in a simple way as to the extent to which the existing system agrees with the reference system. According to the invention, in this way not only can individual functional relationships for specific degrees of freedom, for example, be formed as described above, but entire so-called fingerprints of the vibration isolation system IS, which permit an overall description of the isolation system in vibration isolation technical terms. To this extent, for example, the measurement of all the functional relationships listed above for all six degrees of freedom in the "feedback control loops" can be designated the fingerprint. These fingerprints can in turn be determined and compared with one another in accordance with the invention and in accordance with the above individual measurement comparison under different states of the vibration isolation system. Of course, this does not exclude a comparison of individual measurements with parts of a fingerprint, if this is expedient, for example for fault detection. With the formation and the comparison of fingerprints on the basis of fault databases, for the first time an expert system for fault detection on the vibration isolation system IS is created with which, for example, it is possible to distinguish faults which are caused firstly by the isolation element or secondly by the vibration isolation device or the sensors or actuators, etc. Furthermore, in particular in a simple way, typical faults on the isolation element can be detected, localized and rectified. Such faults can be, for example: on the isolation element, a screw or a hose etc. has become loose. Such a change in state can manifest itself, for example, in a specific structure resonance STR or in a change to the structure resonance STR.

As a further host-side application within the context of the invention, the visualization tool (3DView) should be named, amongst others. This application is capable of showing the movement of the isolation element with micrometer accuracy within the context of a 3D representation. In this case, an isolation element that can be simulated can be matched in terms of size and shape to individual needs. Furthermore, an extremely wide range of vibration isolation systems can be simulated. The amplitude of the isolation element movement can be scaled in various ways here. Furthermore, overall tolerance ranges for the vibration can be defined, both in the horizontal and in the vertical direction of the isolation element. Furthermore, it is possible to observe the movement of the isolation element from various points of view.

Because of the open design of the recording system according to the invention, it is in principle possible to expand the computer program according to the invention or the apparatus according to the invention with as many further modules as desired. In this connection, mention should also be made of the "event logging application" ELA. Using this application, it is possible to monitor a series of control functions with one module. In this case, this is for example the cyclic monitoring of motor states and temperatures of the actuating motors, controlling a pneumatic isolation system, the functional monitoring or performance monitoring of the vibration isolation device IS and the monitoring of the changeover of the control loop to stabilize the isolation system. In this case, the individual monitoring functions can be adjusted individually. The users can be made aware of possible threshold value violations or changeover events via automatically switchable information windows, including via e-mail.

What is claimed is:

1. A method of recording a vibration isolation system having at least one vibration isolation device that can be assigned to an isolation element, the vibration isolation system being assigned a at least one of a closed-loop and open-loop control device, including the following steps:
   a) providing at least one of a closed-loop and open-loop control structure
   b) picking up and processing at least one of signals and variables related to the isolation system by exciting the vibration isolation system into vibration,
   c) forming at least one isolation system characteristic reference fingerprint data set on the basis of the control structure and the recorded variables for assessing the vibration isolation system,
   d) recording and forming an actual fingerprint data set,
   e) comparing at least part of the reference fingerprint with at least part of the actual fingerprint,
   f) assessing the state of the vibration isolation system on the basis of specific deviations between the reference and the actual fingerprint.

2. The method as claimed in claim 1, wherein the method comprises the configuration of the closed-loop and open-loop control structure.

3. The method as claimed in claim 1, wherein the method comprises the provision of control loops and types of control in the closed-loop and open-loop control structure.

4. The method as claimed in claim 1, wherein the method includes the selection between at least one of feedback, feed forward control and adaptive control in the closed-loop and open-loop structure.

5. The method as claimed in claim 1, wherein the method comprises the definition of at lest one of acceleration-determined, speed-determined and position-determined control loops in the closed-loop and open-loop control structure.

6. The method as claimed in claim 1, wherein the method comprises the configuration of the closed-loop and open-loop control structure and the provision of closed-loop and open-loop control variables in the closed-loop and open-loop control structure.

7. The method as claimed in claim 1, wherein the method comprises the definition of actuator-specific and sensor-specific variables in the closed-loop and open-loop control structure.

8. The method as claimed in claim 1, wherein the method comprises the timing of the control loops.

9. The method as claimed in claim 1, wherein the method comprises the step of closed-loop and open-loop control of the vibration isolation system, with the aid of at least one of the variables, signals and the isolation system characteristic data set.

10. The method as claimed in claim 1, wherein the method comprises the provision and adaptation of interfaces between the vibration isolation system and the closed-loop and open-loop control device and external equipment.

11. The method as claimed in claim 1, wherein the method includes the provision of interfaces for at least one of feeding and picking off external or internal signals.

12. The method as claimed in claim 1, wherein the method includes the monitoring and control of the interfaces.

13. The method as claimed in claim 1, wherein the method comprises the recording of data sets.

14. The method as claimed in claim 1, wherein the method includes the testing of the closed-loop and open-loop control structure.

15. The method as claimed in claim 1, wherein the method comprises the provision of at least one of external and internal excitation signals.

16. The method as claimed in claim 1, wherein the method comprises the configuration of the excitation signal provision.

17. The method as claimed in claim 1, wherein the method comprises monitoring the method steps.

18. The method as claimed in claim 1, wherein the method includes at least one of picking up and determining data with reference to vibration-isolation-specific functional relationships.

19. The method as claimed in claim 1, wherein the method comprises at least one of picking up and determining data that can be assigned to a power spectrum.

20. The method as claimed in claim 1, wherein the method comprises at least one or picking up and determining data that can be assigned to a transfer function.

21. The method as claimed in claim 1, wherein the method comprises at least one of picking up and determining data that can be assigned to a vibration coherence function.

22. The method as claimed in claim 1, wherein the method comprises at least one of picking up and determining data that can be assigned to a vibration phase function.

23. The method as claimed in claim 1, wherein the method comprises at least one of picking up and determining of the data for all the vibratory degrees of freedom envisaged.

24. The method as claimed in claim 1, wherein the method comprises the production of vibration tolerance bands.

25. The method as claimed in claim 1, wherein the method comprises the dynamic recording of fingerprint data sets.

26. The method as claimed in claim 1, wherein the method comprises the simulation of the vibration isolation system.

27. The method as claimed in claim 1, wherein the simulation comprises the excitation of vibrations of the vibration isolation system.

28. The method as claimed in claim 1, wherein the method comprises the assignment of fingerprints or data sets to fault messages.

29. The method as claimed in claim 1, wherein the method includes the diagnosis of the vibration isolation system.

30. The method as claimed in claim 1, wherein the method includes the visualization of at least one of the variables, the data and the relationships.

31. A computer program having program code means for carrying out a method as claimed in claim 1, when the program is executed on a computer.

32. The computer program as claimed in claim 31, wherein the computer program comprises a plurality of program modules.

33. The computer program as claimed in claim 31, wherein the computer program comprises a controller-specific program module for the closed-loop and open-loop control of the vibration isolation system.

34. The computer program as claimed in claim 31, wherein the controller module includes diagnostic capabilities relating to the vibration isolation system.

35. The computer program as claimed in claim 31, wherein the controller module is designed to generate and feed excitation signals into the controller.

36. The computer program as claimed in claim 31, wherein the controller module comprises a command-driven interface.

37. The computer program as claimed in claim 31, wherein the computer program comprises user-related function modules, for at least one of communication with and control of the controller module and of the controller.

38. The computer program as claimed in claim 31, wherein the function modules include program tools for at least one of installation, visualization diagnosis and control loop tuning and controller function monitoring.

39. A system for recording a vibration isolation system, which comprises a computer program as claimed in claim 31.

40. An apparatus, for carrying out a method as claimed in claim 1 for executing a computer program that comprises a plurality of program modules, comprising:

a vibration isolation device, on which an isolation element can be arranged, which comprises
one or more components, comprising of at least one of sensors and actuators, arranged for vibration-isolating operation, which cooperate with a closed-loop and open-loop control device in such a way that at least one fingerprint data set that is characteristic of the vibration isolation system can be provided,
means of comparing at least part of a reference fingerprint with an actual fingerprint,
means of assessing the state of the vibration isolation system on the basis of specific deviations between the reference and the actual fingerprint.

41. The apparatus as claimed in claim 40, wherein the closed-loop and open-loop control device is of modular design.

42. The apparatus as claimed in claim 40, wherein the closed-loop and open-loop control device comprises at least one of a controller unit and user-oriented function units.

43. The apparatus as claimed in claim 40, wherein the function units include units for at least one of installation, visualization and diagnosis and/or control loop tuning and/or controller function monitoring.

44. A system for recording a vibration isolation system, which comprises an apparatus as claimed in claim 40.

45. A system for recording a vibration isolation system, which comprises a method as claimed in claim 1.

* * * * *